(12) United States Patent
Delouvee et al.

(10) Patent No.: US 6,227,757 B1
(45) Date of Patent: May 8, 2001

(54) DEVICE FOR CONNECTING TWO TUBES TOGETHER

(75) Inventors: Bernard Delouvee, La Garenne-Colombes; Alain Vernerey, Garancieres, both of (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/151,815

(22) Filed: Sep. 14, 1998

(30) Foreign Application Priority Data

Sep. 18, 1997 (FR) .................................................. 97 11630

(51) Int. Cl.[7] ....................................................... F16B 2/08
(52) U.S. Cl. ......................... 403/400; 403/398; 403/385; 248/65
(58) Field of Search .................................... 403/400, 399, 403/398, 390, 389, 388, 385; 248/74.1, 74.4, 65, 67.7, 68.1

(56) References Cited

U.S. PATENT DOCUMENTS

| | | | |
|---|---|---|---|
| 2,215,283 | 9/1940 | Adler | 174/40 |
| 2,352,145 | 6/1944 | Wright | 248/58 |
| 2,655,088 * | 10/1953 | Charley | 403/389 |
| 2,894,773 * | 7/1959 | Noe | 403/385 |
| 2,906,294 | 9/1959 | Peterson | 138/48 |
| 3,370,815 | 2/1968 | Opperthauser | 248/74 |
| 3,761,600 | 9/1973 | Perry | 174/16 |
| 3,787,016 | 1/1974 | Laval, Jr. | 248/49 |
| 3,924,676 | 12/1975 | Bennett | 165/172 |
| 4,032,246 * | 6/1977 | Waara | 403/390 |
| 4,115,966 * | 9/1978 | DeLee | 403/385 |
| 4,126,012 | 11/1978 | Waller | 405/157 |
| 4,146,203 | 3/1979 | Williams | 248/62 |
| 4,391,426 | 7/1983 | Gothberg | 248/49 |
| 4,516,296 * | 5/1985 | Sherman | 403/398 X |
| 4,530,478 | 7/1985 | McClellan | 248/62 |
| 4,718,459 | 1/1988 | Adorjan | 138/105 |
| 5,039,039 | 8/1991 | Schaffer | 248/59 |
| 5,102,073 | 4/1992 | Lestenkof, Jr. | 248/49 |
| 5,111,770 * | 5/1992 | Weelink | 403/390 X |
| 5,215,281 * | 6/1993 | Sherman | 248/74.1 |
| 5,961,248 * | 10/1999 | Tourtellotte | 403/400 |

FOREIGN PATENT DOCUMENTS

| | | |
|---|---|---|
| 1 091 746 | 4/1955 | (FR) . |
| 1 125 029 | 10/1956 | (FR) . |
| 2019664 | 10/1979 | (GB) . |
| 2 120 310 | 11/1983 | (GB) . |
| 2 241 735 | 9/1991 | (GB) . |

* cited by examiner

Primary Examiner—Harry C. Kim
(74) Attorney, Agent, or Firm—Wolf, Greenfield & Sacks, P.C.

(57) ABSTRACT

A device for connecting together a first tube and a second tube placed at a 90° angle with respect to one another. The device includes a flat base placed between the two tubes, and pierced with at least two holes, yokes for joining together the first tube with the base and for partially surrounding at least a portion of the first tube, and collars for joining the second tube and the base, the collars partially surrounding at least a portion of the second tube and interacting with the holes and with the yokes. The device may be used for connecting together pipes, especially in a gallery or a cell in the nuclear industry.

22 Claims, 5 Drawing Sheets

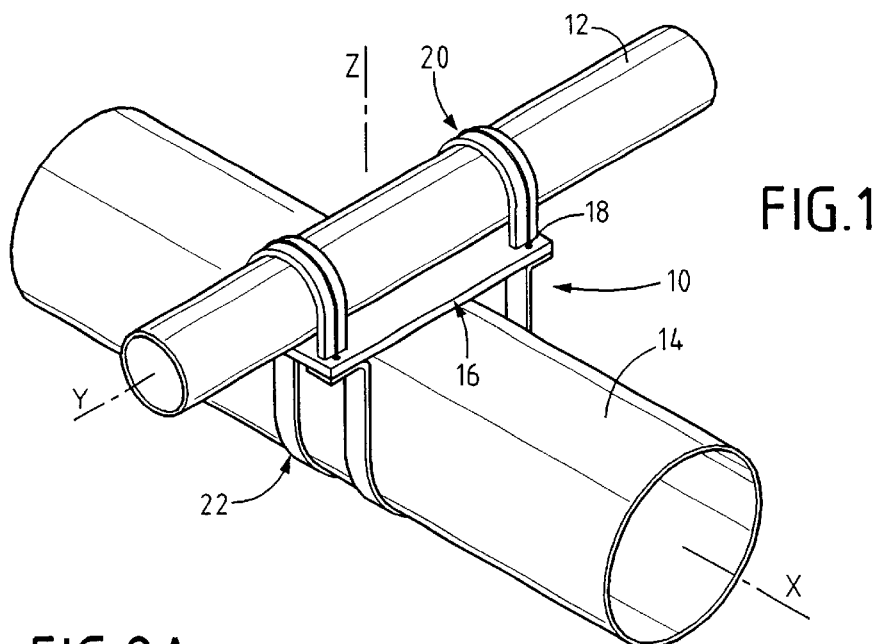
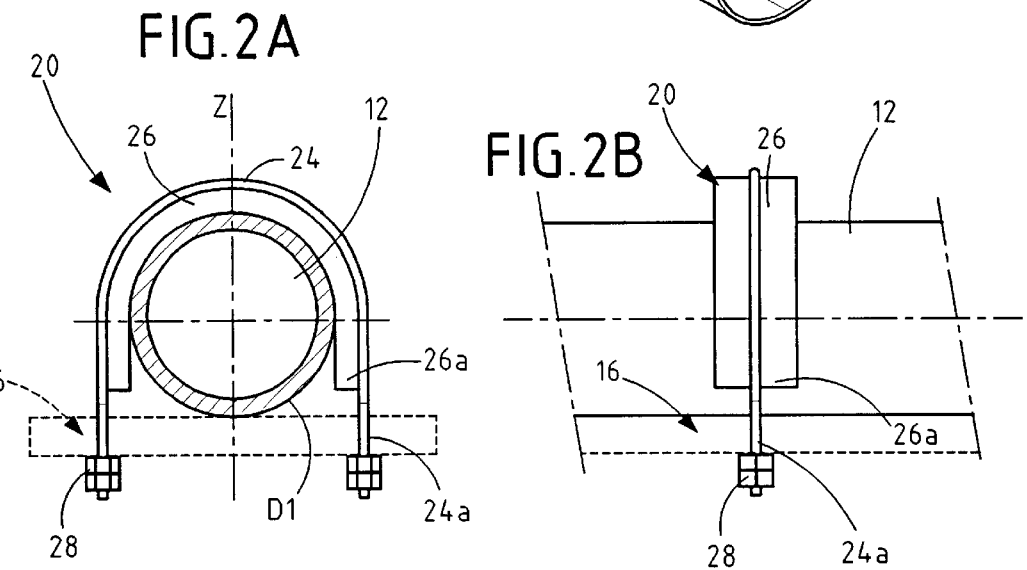
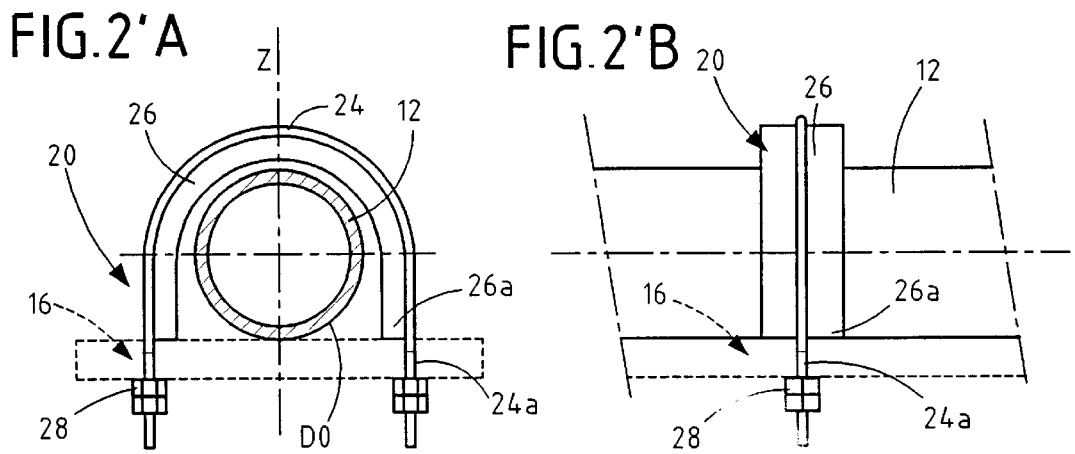

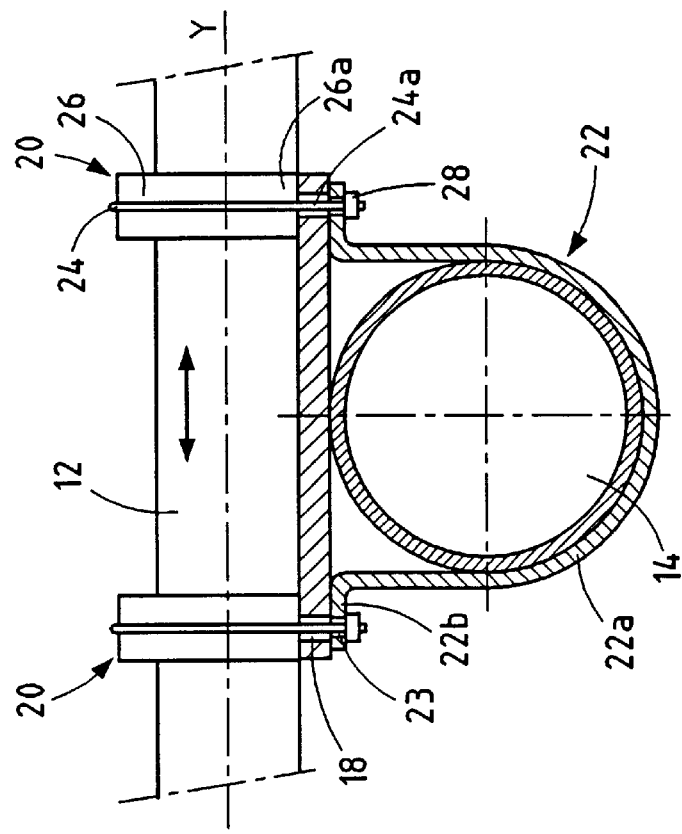
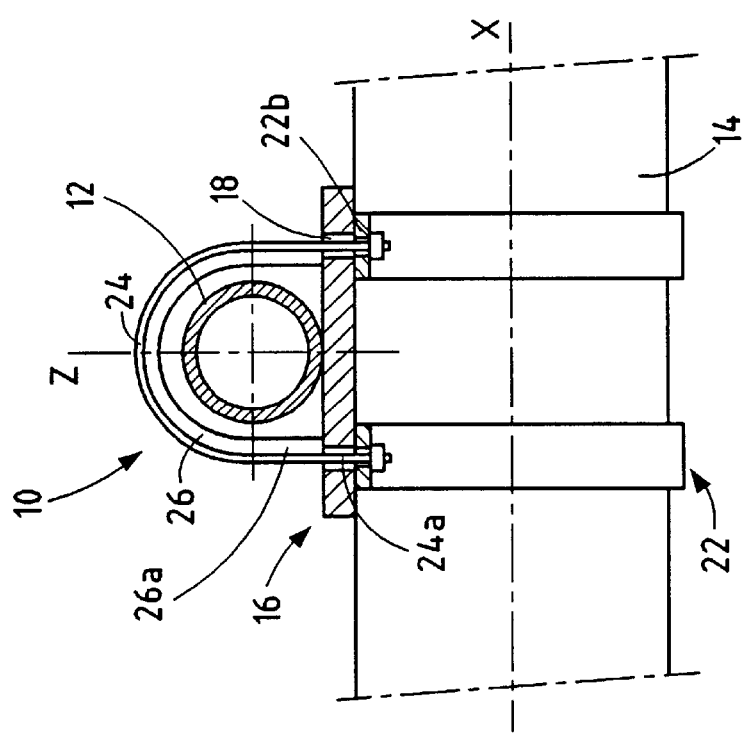
FIG. 3B
FIG. 3A

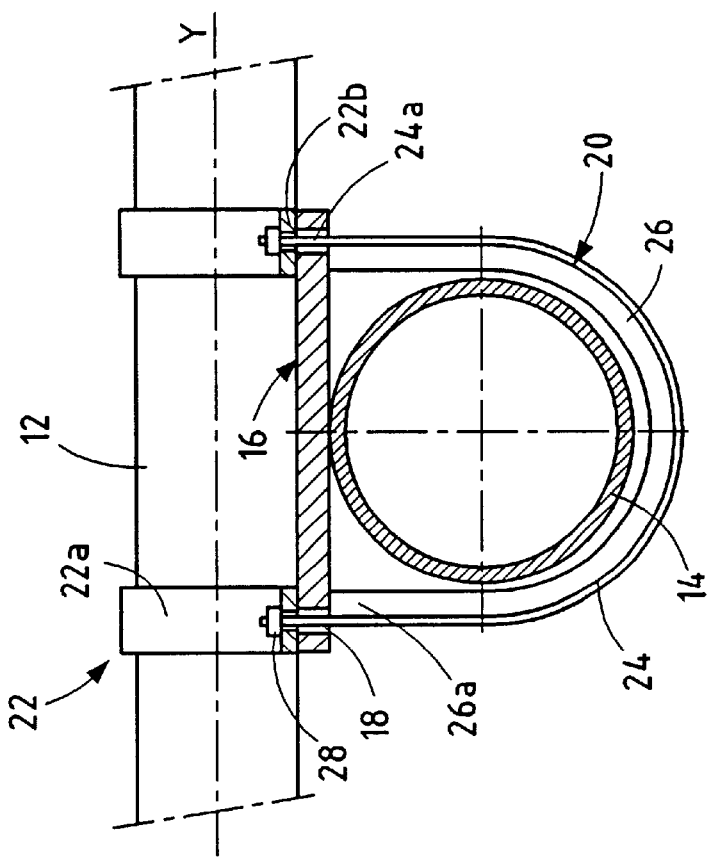
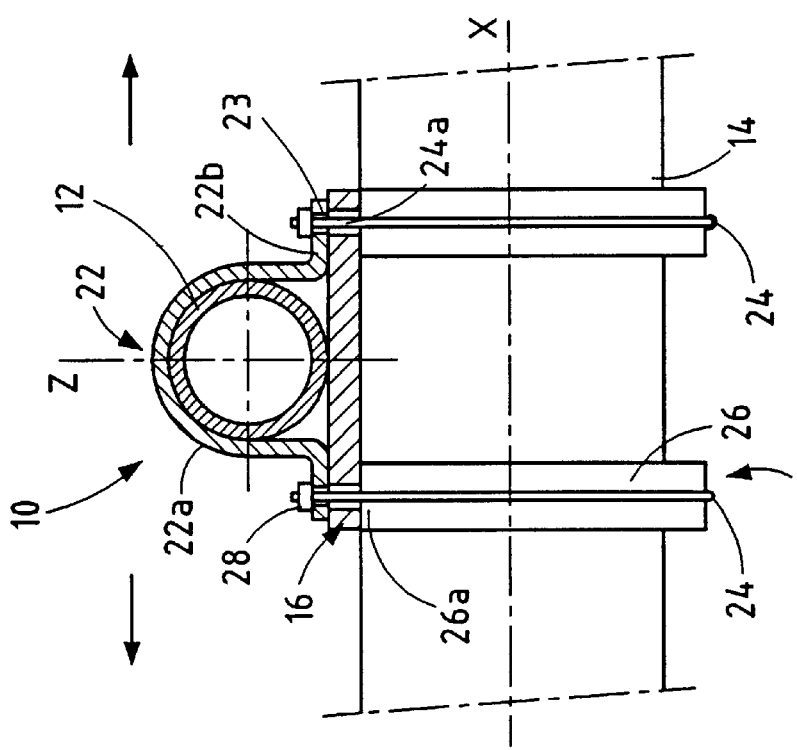

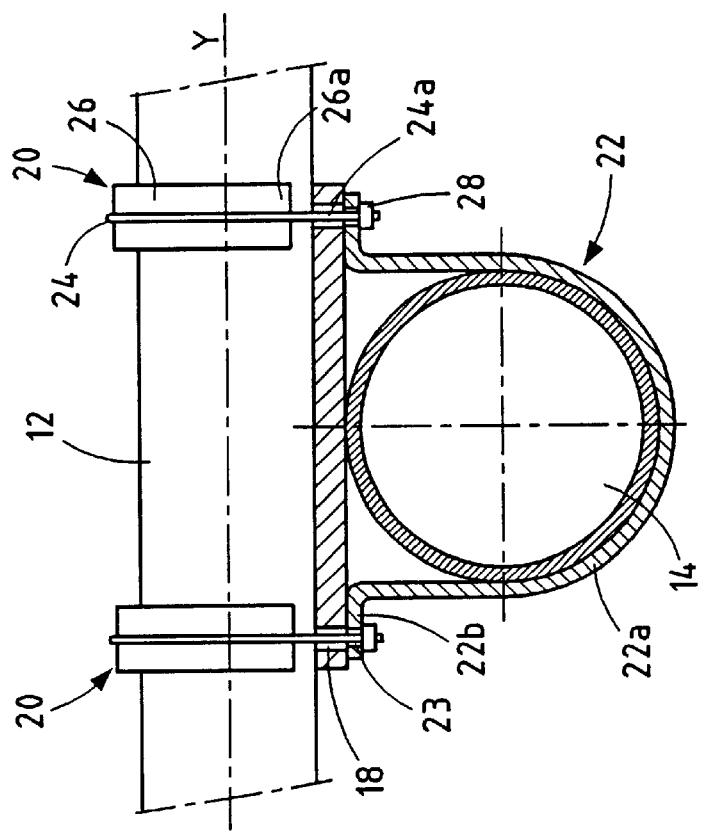
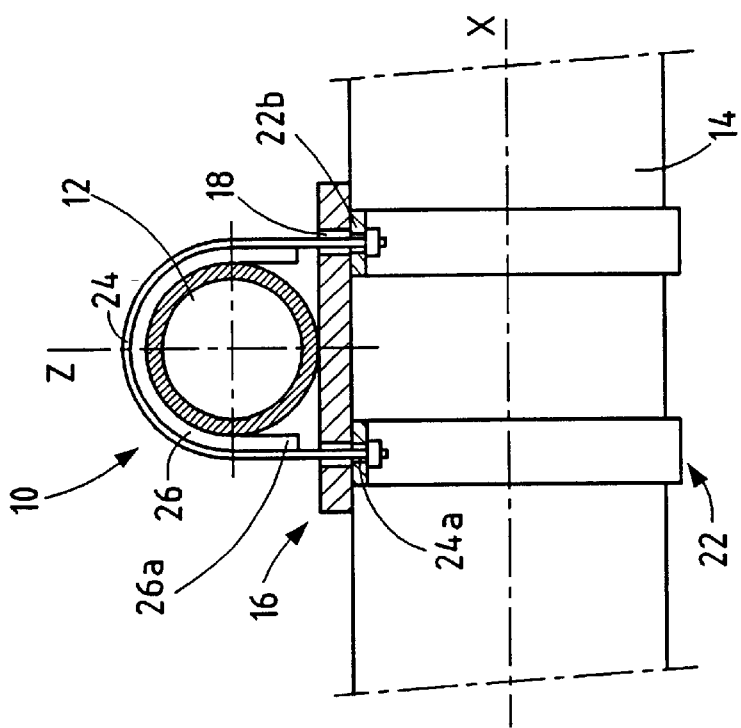
FIG. 6B
FIG. 6A

DEVICE FOR CONNECTING TWO TUBES TOGETHER

The invention relates to a device for connecting together a first tube of circular cross-section with axis X, acting as a support, and a second tube forming a supported pipe, of circular cross-section with axis Y, these two tubes being placed at approximately 90° from one another.

More specifically, the invention relates to a device allowing a tube arranged horizontally or inclined, this tube constituting a pipe through which a fluid flows, such as a heat-transfer fluid or a radioactive fluid, to be attached to a support placed at approximately 90° from this tube, this support preferably being arranged horizontally.

For specific applications, such as connecting pipes to support elements, the pipes in particular being intended for the flow of utility fluids such as heat-transfer fluids and/or radioactive fluids in nuclear installations for example, it is necessary for the connecting device to display a particularly good resistance to earthquakes, for it to allow a support element and tubes of different diameters to be connected, and for the way in which the said connecting device is mounted to be as easy and reliable as possible.

Usually, to support pipes, these pipes generally being grouped in horizontal, vertical or inclined rows, use is made of standard open sections. For the use of such sections to give sufficient earthquake resistance, these open sections connected together into a support framework have to have a very large cross-sectional area or be strengthened by the addition of a flat section which closes them.

It will be understood that, in an installation that has, for obvious safety reasons, to be able to withstand earthquakes, it is necessary for a connecting device designed to offer satisfactory inertia, particularly in torsion, to be incorporated.

The present invention provides a connecting device which exhibits good resistance to earthquakes, is easy to assemble and allows two elements which have different-sized cross-sections to be connected together.

In order to achieve this objective, according to the invention, the connecting device comprises:

an approximately flat, advantageously parallelepipedal, base placed between the two tubes and pierced with at least two holes;

first adjustable-tightness means of joining together one of the tubes and the said base; the first joining means partially surrounding at least a portion of this tube and interacting with the holes; and second means of joining together the other tube and the base; the second joining means partially surrounding at least a portion of this other tube and interacting with the holes and with the first joining means.

It will be understood that by virtue of the use of the same holes in the base for mounting the first joining means and the second joining means, each of these partially surrounding at least a portion of one of the tubes, there is good attachment and good cohesion of the connecting device according to the invention, which thus has satisfactory inertia to withstand earthquakes.

Furthermore, the use of tubular supports strengthens the symmetry of fitting between the support and the pipe and allows the pipe to be inclined about its support at will.

According to a preferred embodiment, the first joining means comprise at least one yoke comprising a flat U-shaped hoop partially surrounding one of the tubes and the ends of which are in contact with or close to the base, and a clamping hoop gripping the flat hoop over its entire external periphery, each end of the clamping hoop passing through the base through one of the holes and having means for tightening the said clamping hoop with respect to the flat hoop and the second joining means comprise at least one flat collar, each of the ends of which is attached to the base at one of the holes by means of the corresponding end of the clamping hoop.

Furthermore, provision is preferably made for each of the ends of the flat collar to form a joining lug which comprises an opening intended to be placed facing a hole in the base.

According to a preferred embodiment, the means for tightening the clamping hoop of the first joining means comprise screw threads intended to pass through the base through the holes and to interact with tightening nuts.

According to an advantageous alternative form:

the flat collar of the second joining means is in the shape of an Ω (it has a central part in the shape of a U to the ends of which joining lugs, preferably rectangular and flat, are connected, preferably at approximately 90°);

the base has four holes passing right through it in a direction parallel to the Z axis; the X, Y, Z axes which are orthogonal to each other in pairs, denoting, respectively:

the axis of the support tube;

the axis of the supported pipe;

an axis orthogonal to the said axes of the support tube and of the supported pipe;

the connecting device has two yokes and two flat collars.

In the context of this advantageous alternative form, the said holes (in the base), yokes and collars are preferably arranged symmetrically; the planes (X,Z) and (Y,Z) then forming planes of symmetry of the device.

It will be understood that this preferred embodiment leads to a symmetric structure allowing the assembly to be better anchored, that there is then the possibility of having or not having the various elements clamped at the time of assembly and the possibility of varying the inclination of the connecting device to suit the slope of the pipe and/or of the support.

As a preference, the connecting device is used to support pipes on a horizontal support, but it will be understood that the connecting device according to the invention also allows other configurations such as the connection of a horizontal or slightly inclined (the angle of inclination being, for example, 2°) pipe to a support tube arranged vertically or alternatively connection between a pipe and a support tube which form between them a plane oriented in any direction, provided that the pipe and the support tube make an angle of approximately 90° between them.

The connecting device according to the present invention is advantageously, but not exclusively, used for connecting pipes intended for the flow of utility fluids and/or radioactive fluids in a gallery or cell of the nuclear industry, to tubular support elements.

The connecting device according to the invention may be produced in various alternative ways so that it will either allow a relative movement of translation between the supported pipe and the support tube (longitudinal guidance, transverse guidance, or both at once) or will fully lock the supported pipe and support tube together. For that, in the context of the preferred embodiment of the connecting device of the invention, the dimensions of the flat hoop in particular are modified, these dimensions governing whether or not the yoke is clamped around the tube (support or supported pipe): a flat hoop with dimensions that exceed the diameter of the tube surrounded creates slack and allows the tube surrounded by the yoke comprising this flat hoop to be free to move. If a possibility of movement between the flat collar and the tube it surrounds is desired, then an additional piece or spacer piece which moves the end of the flat collar away from the base and creates slack between the base and the tube surrounded by this flat collar, is provided. It is also possible to surround the support tube with the yoke and the supported pipe with the flat collar or, conversely, to surround the support tube with the flat collar and the supported pipe with the yoke.

Other features and advantages of the present invention will become more clear from reading the description that provides several embodiments of the invention which are given by way of non-limiting example. The description refers to the appended figures in which:

FIG. 1 is a diagrammatic view in perspective of an entire connecting device according to the invention;

FIGS. 2A and 2B depict, seen from the front and from the side, respectively, first joining means consisting of a yoke and surrounding a tube of diameter D1;

Figure 5A:
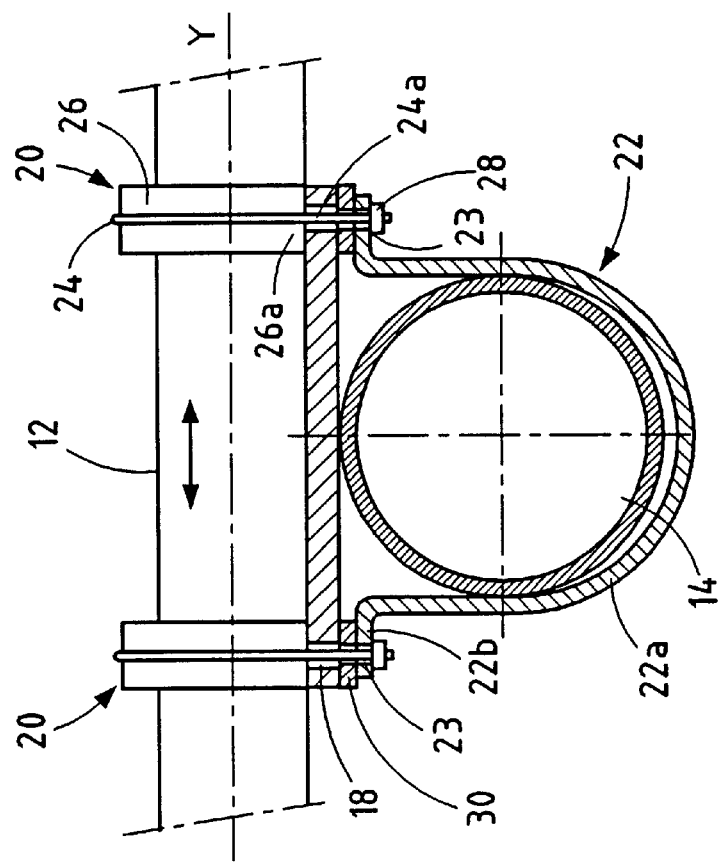
Figure 5B:
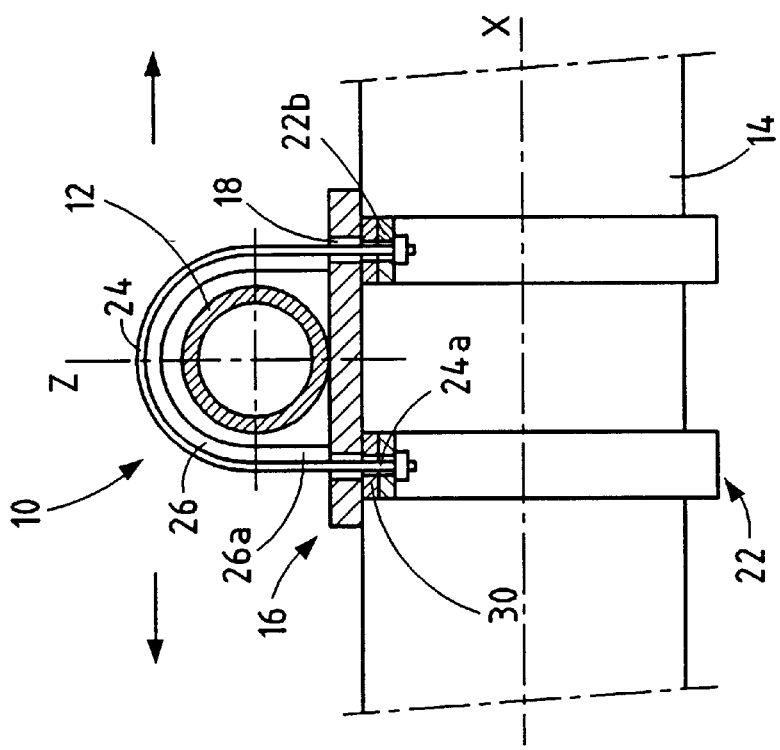

FIGS. 2'A and 2'B are views similar to those of FIGS. 2A and 2B where the tube surrounded has a diameter D0 which is much smaller than diameter D1;

FIGS. 3A and 3B depict, viewed from the front and from the side, respectively, a first embodiment of the connecting device according to the invention, which allows one degree is freedom for the supported tube, that of longitudinal translation with respect to the axis of this supported tube;

FIGS. 4A and 4B depict, viewed from the front and from the side respectively, a second embodiment of the connecting device according to the invention, which generates one degree is freedom for the supported tube, that of transverse translation with respect to the axis of this supported tube;

FIGS. 5A and 5B depict, viewed from the front and from the side respectively, a third embodiment of the connecting device according to the invention, which grants the supported tube two degrees of freedom in translation; and FIGS. 6A and 6B depict, viewed from the front and from the side respectively, a fourth embodiment of the connecting device according to the invention, which grants the supported tube no degree of freedom and therefore locks it in place on its support.

As is depicted in FIG. 1, a connecting device 10 of the invention allows two tubes, possibly of different diameters, placed at approximately 90° from one another to be connected together: a first tube 14 of axis X constituting a support tube is connected to a second tube 12 of axis Y constituting a supported pipe. In FIG. 1, these two tubes 12 and 14 are placed horizontally but it will be fully understood that the two axes X and Y may have any other orientation whatsoever without this in any way altering the connecting device 10.

According to the preferred embodiment depicted in FIG. 1, connecting device 10 comprises a right-angled parallelepipedal base 16 pierced with four holes 18; this base 16 has its length and width parallel to the Y and X axes respectively of the tubes and is placed between the supported pipe 12 and the support tube 14. The connecting device 10 also comprises two yokes 20, each surrounding a portion of the pipe 12 and two flat collars 22 each surrounding a portion of the support tube 14, the ends of the yokes and of the flat collars being joined together and to the base by means of the holes 18 as is described in greater detail later.

Reference is now made to FIGS. 2A and 2B which illustrate a yoke 20 in greater detail. Each yoke 20 has a clamping hoop 24 of circular section constituting a U-bolt intended to surround a portion of one of the tubes and the straight and threaded ends 24a of which are intended to pass through two of the holes 18 in the base 16 and to interact with tightening nuts 28. Each yoke 20 also has a flat hoop 26 constituting a lining placed between the tube and the clamping hoop 24.

As can be seen more specifically in FIGS. 2A and 2'A, there may or may not be a certain amount of slack between the said tube and the said flat hoop 30 26, depending on the diameter of the tube, possibly forming a pipe, surrounded by the yoke 20 and on the size of the flat hoop 26.

In the case of FIGS. 2A and 2B, the tube 12 has a large diameter D1 equal to the separation between the straight branches of the U of the flat hoop 26. The said diameter D1 exceeds the distance between the ends 26a of the flat hoop 26 and the bottom of the U. A portion of the external surface of the tube 12, the cross-section of which constitutes the upper semi-circle of the tube 12, is in contact with the inside of the flat hoop 26, in the upper part of the flat hoop 26 forming the rounded base of the U. The lower part of the tube 12 is in contact with the base 16, depicted in dotted lines in FIG. 2A, along a portion of the generatrix of the tube 12. In this instance, the tube 12 is locked in place by the yoke 20 which is attached by mounting tightening nuts 28 on the threaded ends 24a of the clamping hoop 24, wherein the nuts 28 are tightened in order to lock the tube 12 between the base 16 and the yoke 20; the straight branches of the U of the flat hoop 26 are of such a length that their ends 26a are not in contact with the base 16.

In the second instance depicted in FIGS. 2'A and 2'B, the diameter D0 of the tube 12 is (smaller than D1) smaller than the distance between the ends 26a of the flat hoop 26 and the bottom of the U. When fitting the yoke 20, tightening the nuts 28 onto the threaded ends 24a of the clamping hoop 24, there is a limiting position that corresponds to the instant when the ends 26a of the flat hoop 26 come into contact with the base 16 so that the nuts 28 are locked and the tube 12 is not clamped tightly in the yoke 20 because there is some slack between the said tube 12 (of outside diameter D0) and the flat hoop 26. In the case illustrated in FIGS. 2'A and 2'B, there is slack both between the tube 12 and the straight branches of the flat hoop 26, and between the tube 12 and the assembly that consists of the base 16 and the rounded bottom of the U of the flat hoop.

It will be understood from the foregoing explanations that the clamping of the yoke 20 onto the tube it surrounds is governed by the dimensions of the flat hoop 26, that is to say the diameter of the rounded base of the U, on the one hand, and by the length of the branches of the U on the other hand, as a function of the diameter of the tube, so that the flat hoop 26 either does or does not transmit to the tube in question the tightening of the clamping hoop 24 placed around the said tube. Furthermore, the flat hoop 26 constitutes a lining that protects the tube because it prevents the external surface of the tube which is in contact with the yoke 20 from becoming deformed by spreading the compressive load generated by the clamping hoop 24 over a portion of the periphery of a portion of tube corresponding to the width of the flat hoop 26.

For comparative purposes, FIGS. 2A and 2'A depict two possible diameters (D1 and D0 respectively, with D1>D0) for the tube 12, supported pipe or support tube. It is quite obvious that, in practice, the dimensions of the first joining means are adapted to suit those of the tube 12 used rather than vice versa.

The (outside) diameter of the tube 12 is in fact dictated by various constraints, particularly the flow rate of fluid travelling through the tube (12) (in the case of a supported pipe) and by the wall thickness of the said tube (012) and/or by the strength of the structure (case of a supported pipe and of a support tube). As the diameter is fixed, the dimensions of the first joining means—particularly those of the flat hoop 26—are adapted to suit the diameter, depending on the degrees of freedom desired. In order to generate slack between the flat hoop and the tube it surrounds, or even to distribute such slack asymmetrically with respect to the two axes of the tube, there are two parameters that can be used:

the inside diameter (of the circular part) of the flat hoop;

the length of the straight branches of the flat hoop.

Thus, by selecting a yoke 20 which has a flat hoop 26 of appropriate length and diameter, it is possible to envisage clamping the tube tightly in the yoke 20 so that this tube has no degree of freedom, or alternatively it is possible to provide a larger flat hoop 26 which allows a certain amount of slack between the tube and the yoke 20 so that this tube can slide in the yoke, this giving it a degree of freedom in translation along its own axis.

The connecting device 10 proposed comprises, as a preference (as shown in the appended figures) two yokes 20 and two flat collars 22 arranged in such a way as to form an assembly that is symmetric with respect to the planes (X,Z) and (Y,Z), the axes X,Y,Z being mutually orthogonal. In this configuration, the mid-planes of each pair of collars 22 or of yokes 20 are offset from one another by a distance that exceeds the diameter of the tube that this pair does not surround.

We are now going to describe, in turn, with reference to FIGS. 3A to 6B, four different embodiments of the connecting device of the invention allowing the supported pipe 12 and/or the support tube 14 a varying number of degrees of freedom. Indeed, depending on the configuration and location of the connecting device 10, it may be necessary for some connecting devices to lock the support tube and the supported pipe tightly together. In other instances, particularly so that the overall structure can withstand earthquakes or alternatively when it is necessary to take pipe expansion into account, connecting devices which allow a relative movement between the supported pipe and the support tube may be desired, so as to avoid excessive deformation and/or detachment between the supported pipe and the support tube and/or rupture of one of the two tubes.

FIGS. 3A and 3B illustrate a first embodiment of the connecting device according to the invention, in which one degree of freedom is given to the supported pipe which can move in translation along its own axis Y, this causing longitudinal guidance of the supported pipe 12 by the yoke 20.

This first embodiment of the connecting device is characterized in that the yokes 20 surround the second tube 12 (supported pipe), and the hoops 26 of the yokes 20 are dimensioned in such a way that when their ends 26a are in contact with the base 16, the second tube 12 can slide in the yokes 20. The collars 22 surrounding the first tube 14 (support) are shaped in such a way that, when their joining lugs 22b are pressed against the base 16 by the tightening nuts 28 mounted on the threaded ends 24a of the clamping hoops 24, the first tube 14 is locked in place.

In this first embodiment, once the yoke 20 has been fitted, the ends 26a of the flat hoop 26 come into contact with the base 16 and there is a certain amount of slack between the supported pipe 12 and the yoke 20.

Two flat collars 22 are fitted around the support tube 14, and the 20 following description of their structure and of the way in which they are attached holds true for the four different embodiments described here.

The flat collars 22 comprise a U-shaped central part 22a to the ends of which joining lugs 22b, preferably rectangular and flat, are connected, preferably at approximately 90°. This design of the shape of the flat collars 22 holds true for all of this description in which the design is summarized by the term "Ω-shaped". Consistently throughout this description, the length and the diameter of the U-shaped central part 22a are designed to surround a tube tightly. When the joining lugs 22b rest against the base 16, the tube is in contact with this base 16 along one of these generatrices: the tube, surrounded by a flat collar 22, is therefore locked in place by this flat collar 22. The joining lugs 22b of the flat collars 22 have an opening 23 placed in line with the holes 18 in the base 16 so that each end 24a of a clamping hoop 24 passes, in turn, through a hole 18 then through an opening 23. A tightening nut 28 is mounted on the screw thread at the end 24a, coming into contact against the rear face of the joining lug 22b, and the front face of this joining lug 22b is in contact with the base 16. Thus, the yokes 20 on the one hand and the clamping collars 22 on the other hand, are mounted in parallel pairs, the two yokes being crossed with respect to the two collars and interacting with each other through the four holes 18.

For the first embodiment illustrated in FIGS. 3A and 3B, the yokes 20 surround the supported pipe 12 without clamping it, and the two flat collars 22 grip the support tube 14.

Reference is now made to FIGS. 4A and 4B which illustrate the second embodiment of the connecting device 10 according to the invention.

This second embodiment of the connecting device is characterized in that the yokes 20 surround the first tube 14 (support), and the flat hoops 26 of the yokes 20 are dimensioned in such a way that when their ends 26a are in contact with the base 16, the first tube 14 can slide in the yokes 20. The collars 22 surrounding the second tube 12 (supported pipe) are shaped in such a way that when their joining lugs 22b are pressed against the base 16 by the tightening nuts 28 mounted on the threaded ends 24a of the tightening hoops 24, the second tube 12 is locked in place.

In this case, the objective is to obtain one more degree of freedom for the supported pipe 12, that is, translation along an axis parallel to the X-axis of the support tube 14 and perpendicular to the Y-axis of the supported pipe 12. To obtain this transverse guidance, all that is required is for the assembly procedure described above in relation to FIGS. 3A and 3B to be followed, swapping the position of the yokes 20 and of the flat collars 22. The supported pipe 12 is gripped by the two collars 22 and the support tube 14 is surrounded by the two yokes 20 in which the flat hoop 26 is long enough and has a large enough diameter that when its ends 26a are in contact with the base 16, there is some slack between the support tube 14 and the yoke 20. The support tube 14 is in contact with the base 16 as illustrated in FIGS. 4A and 4B because the fixed assembly comprising the supported pipe 12, the flat collars 22 and the base 16 is resting against the support tube 14 which is under the pipe 12. In this way, the connecting device 10 remains secured to the supported pipe 12, and the assembly is able to move in the direction of the X-axis along the support tube.

Reference is now made to FIGS. 5A and 5B which illustrate a third embodiment of the connecting device 10 according to the invention, in which the aim is to give the supported pipe 12 two degrees of freedom corresponding to two translational movements in directions parallel to the X and Y axes, respectively. This third embodiment is obtained starting from the assembly corresponding to the first or second embodiment (the scenario illustrated in FIGS. 5A and 5B originates from the first embodiment, but one could also start from the assembly corresponding to the second embodiment) in which a drilled spacer piece 30 is inserted between the joining lugs 22b of each collar 22 and the base 16, the drilling of this spacer piece 30 being positioned so that when fitted it lies facing and in line with the opening 23 of a joining lug 22b and with a hole 18 of the base 16. Four drilled spacer pieces 30 are thus needed in the particular instance illustrated in FIGS. 5A and 5B, but in order to produce the third embodiment of the connecting device of the invention, other alternative forms, such as the use of two long thin spacer pieces each comprising a drilling corresponding to the ends of the two flat collars 22 which lie on the same side of the tube 14 may be envisaged (this particular alternative form would alter FIG. 5A by connecting the two spacer pieces 30 that can be seen, which would then form a single spacer piece, FIG. 5B then remaining unchanged).

The laid pipes are thus supported freely. This is because these spacer pieces 30 generate slack between the support tube 14 (FIG. 5B) and the assembly made up of base 16 and flat collars 22, which slack is equal to the thickness of the said spacer pieces 30.

This third embodiment of the connecting device is characterized in that the yokes 20 surround the second tube 12 (supported pipe), and it also comprises a drilled spacer piece 30 inserted between each joining lug 22b of the flat collars 22 and the base 16 and through which the threaded ends 24a of the clamping hoops pass so that when the first tube 14 (support) is pressed against the end of the flat collar 22 there is slack between the said first tube 14 and the base 16, allowing the device 10 to slide along the first tube 14 (support). The flat hoops 26 of the yokes 20 are dimensioned in such a way that when their ends 26a are in contact with the base 16, the second tube 12 can slide in the yokes 20.

Reference is now made to FIGS. 6A and 6B which illustrate the fourth embodiment of the connecting device according to the invention. This fourth embodiment of the connecting device is characterized in that the yokes 20 surround the second tube 12 (supported pipe), and the flat hoops 26 of the yokes 20 are dimensioned in such a way that when their ends 26a are close to or in contact with the base 16, the second tube 12 is locked in place by the yokes 20. The collars 22 surrounding the first tube 14 (support) are shaped in such a way that when their joining lugs 22b are pressed against the base 16 by the tightening nuts 28 mounted on the threaded ends 24a of the tightening hoops, the first tube 14 (support) is locked in place.

This fourth embodiment of the invention provides a connecting device which grants the supported pipe 12 no degree of freedom so that a support which is locked in place is obtained for pipes which are locked in place. In this fourth embodiment, the yokes 20 surround the supported pipe 12 and the flat collars 22 grip the support tube 14, but the relative position of the yokes 20 and of the flat collars 22 on the tubes could be reversed. There would then be flat hoops 26 of a shorter length and having an inside diameter at most equal to the outside diameter of the supported pipe 12. When the tightening nuts 28 are tightened on the threaded ends 24a of the clamping hoops 24, the supported pipe 12 would come into contact with the flat hoop 26, on the one hand, and with the base 16 along one generatrix of the tube 12, on the other hand, preferably before the ends 26a of the flat hoop 26 come into contact with the base 16. Thus, in this instance, this flat hoop 26, or short lining, does not come into contact with the base. This flat hoop forms a protection for that region of the pipe 12 that is surrounded by the yoke.

Other structural configurations may be envisaged without departing from the scope of the present invention. Thus, other means of attaching together the yokes 20, the base 16 and the collars 22 may be envisaged instead of the interaction of holes, threaded rods and nuts; in particular, complementary shapes which nest together by clipping or elastic deformation may be provided.

The flat collars 22 may have shapes other than the one described earlier, that is to say the Ω shape. Thus, by using, for example, a base of parallelepipedal overall shape, the four corners of which have projections through which there pass holes in a direction that is in the (X,Y) plane, this will allow the use of flat collars which are U-shaped rather than Ω-shaped.

In the appended figures, the supported pipe 12 has a smaller diameter than the support tube 14, but it will be readily understood that the tubes 12 and 14 could have an approximately equal diameter or alternatively that the diameter of the supported pipe could be larger than that of the support tube. Thus, it will be understood that all combinations of diameters of the support tube 14 and of the pipe 12 are possible without departing from the scope of the present invention.

What is claimed is:

1. A device for connecting together a first tube of a circular cross-section with an X axis, acting as a support, and a second tube forming a supported pipe having a circular cross-section with a Y axis, said tubes being placed at approximately 90° from one another, said device comprising:

an approximately flat base adapted to be placed between said two tubes and being pierced with at least two holes;

first joining means adapted to join together one of said tubes and said base, said first joining means being adapted to partially surround at least a portion of said tube and interact with said holes, said first joining means comprising at least one yoke comprising a rigid flat U-shaped hoop adapted to partially surround one of said tubes, and a clamping hoop for gripping said flat hoop over its entire external periphery, each end of said clamping hoop passing through one of said holes of said base and having means for tightening said clamping hoop with respect to said flat hoop; and second joining means adapted to join together the other of said tubes and said base, said second joining means being adapted to partially surround at least a portion of said other tube and interact with said holes and with said first joining means at said base, said second joining means comprising at least one flat collar having collar ends attached to said base using ends of said clamping hoop.

2. The device according to claim 1 wherein each of said flat collar ends forms a joining lug which comprises an opening intended to be placed facing said hole in said base.

3. The device according to claim 2 further comprising a drilled spacer piece adapted to be inserted between each joining lug of said flat collar and said base, said threaded ends of said clamping hoop being adapted to pass through said drilled spacer piece.

4. The device according to claim 2, wherein said flat collar of said second joining means is Ω-shaped, wherein said base has four holes passing through said base in a direction parallel to the Z axis, the X, Y and Z axes being mutually orthogonal, and wherein said device including two said yokes and two said flat collars, said holes, yokes and collars being arranged symmetrically relative to the planes (X, Z) and (Y, Z), which form planes of symmetry of said device.

5. The device according to claim 4, wherein said yokes are adapted to surround the second tube forming the supported pipe, and have said flat U-shaped hoops dimensioned to have their ends in contact with the base so that the second tube can slide in said yokes, and wherein said collars are adapted to surround the first tube acting as the support and are shaped in such a way that when their joining lugs are pressed against the base by tightening nuts mounted on threaded ends of the clamping hoops the first hoop is locked in place.

6. The device according to claim 4 wherein said yokes are adapted to surround the first tube acting as the support and have the flat U-shaped hoops dimensioned to have their ends in contact with the base so that the first tube can slide in said yokes, and wherein said collars are adapted to surround the second tube forming the supported pipe, and have their joining lugs pressed against the base by tightening nuts mounted on threaded ends of the clamping hoops thereby being adapted to lock the second tube in place.

7. The device according to claim 4, wherein said yokes are adapted to surround the second tube forming the supported pipe, and the device comprises a drilled spacer piece inserted between each joining lug of the said flat collars and the base and through which threaded ends of the clamping hoops pass so that when the first tube acting as the support, is pressed against the flat collar ends there is slack between said first tube and the base allowing the device to slide along said first tube and wherein the flat U-shaped hoops of said yokes are dimensioned to have their ends in contact with the base so that the second tube can slide in said yokes.

8. The device according to claim 4, wherein said yokes are adapted to surround the second tube forming the supported pipe, and the flat hoops of said yokes are dimensioned to have their ends close to or in contact with the base thereby being adapted to lock the second tube in place by said yokes, and wherein the collars are adapted to surround the first tube acting as the support, and are shaped to have their joining lugs pressed against the base by tightening nuts mounted on threaded ends of the clamping hoops thereby being adapted to lock the first tube in place.

9. The device according to claim 1, wherein the means for tightening said clamping hoop comprise screw threads designed to pass through said holes of said base and to interact with tightening nuts.

10. The device according to claim 1, wherein the second tube, forming the supported pipe, is used for carrying utility fluids in a service gallery.

11. The device according to claim 1, wherein the second tube is used for carrying radioactive fluids in a service gallery in a nuclear industry.

12. The device according to claim 1 wherein said base is parallelepipedal in shape.

13. A device for connecting tubes, comprising:
   a parallelepipedal base including at least two holes and being arranged for placement between two tubes;
   at least one yoke comprising a rigid flat U-shaped hoop designed to partially surround one of said tubes and a clamping hoop designed to grip an external periphery of said flat U-shaped hoop, said clamping hoop having two ends arranged to pass through said holes of said base from one side of said base and arranged for tightening with respect to said base; and
   at least one flat collar having two collar ends attachable to said base from another side of said base using said two ends of said clamping hoop, said flat collar being designed to surround at least a portion of another of said tubes.

14. The device of claim 13 wherein said two tubes include a first tube forming a support framework and a second tube forming a pipe for conducting fluid.

15. The device of claim 14 wherein said flat U-shaped hoop is adapted to partially surround said second tube and is dimensioned to have its hoop ends located in contact with said base so that said second tube can slide relative to said yoke after tightening said two ends of said clamping hoop to said base.

16. The device of claim 15 wherein each of said two collar ends of said flat collar forms a joining lug that comprises an opening cooperatively arranged with said hole in said base and said end of said clamping hoop, and wherein said flat collar is dimensioned so that said joining lugs enable locking said first tube relative to said base after tightening said two ends of said clamping hoop to said base.

17. The device of claim 14 wherein said flat U-shaped hoop is adapted to partially surround said first tube and is dimensioned to have its hoop ends located in contact with said base so that said first tube can slide relative to said yoke after tightening said two ends of said clamping hoop to said base.

18. The device of claim 14 wherein said flat U-shaped hoop is adapted to partially surround said second tube and is dimensioned to have its hoop ends located near said base so that said second tube is adapted to be locked relative to said yoke after tightening said two ends of said clamping hoop to said base.

19. The device of claim 14 wherein each of said two collar ends of said flat collar forms a joining lug that comprises an opening cooperatively arranged with said hole in said base and said end of said clamping hoop, and wherein said flat collar is dimensioned so that said joining lugs enable locking said first tube relative to said base after tightening said two ends of said clamping hoop to said base.

20. The device of claim 19 further comprising at least two spacer pieces insertable between each said joining lug of said flat collar and said base, said two spacer pieces being designed to allow the device to slide along said first tube after tightening said two ends of said clamping hoop to said base.

21. A device for connecting tubes, the tubes including a first tube forming a support framework and a second tube forming a pipe for conducting fluid, said device comprising:
   a base including at least two holes and being arranged for placement between the two tubes;
   at least one yoke comprising a rigid flat U-shaped hoop designed to partially surround one of said tubes and a clamping hoop designed to grip an external periphery of said flat U-shaped hoop, said clamping hoop having two ends arranged to pass through said holes of said base and arranged for tightening with respect to said base, said flat U-shaped hoop being adapted to partially surround said second tube and being dimensioned to have its hoop ends located in contact with said base so that said second tube is permitted to slide relative to said yoke after tightening said two ends of said clamping hoop to said base; and
   at least one flat collar having two collar ends attachable to said base using said two ends of said clamping hoop, said flat collar being adapted to surround at least a portion of the other of said tubes.

22. A device for connecting tubes, the tubes including a first tube forming a support framework and a second tube forming a pipe for conducting fluid, said device comprising:
   a base including at least two holes and being arranged for placement between the two tubes;
   at least one yoke comprising a rigid flat U-shaped hoop designed to partially surround one of said tubes and a clamping hoop designed to grip an external periphery of said flat U-shaped hoop, said clamping hoop having two ends arranged to pass through said holes of said base and arranged for tightening with respect to said base; and at least one flat collar having two collar ends attachable to said base using said two ends of said clamping hoop, said flat collar being adapted to surround at least a portion of the other of said tubes, each of said two collar ends of said flat collar forming a joining lug that comprises an opening cooperatively arranged with said hole in said base and an end of said clamping hoop, said flat collar being dimensioned so that said joining lugs enable locking said first tube relative to said base after tightening said two ends of said clamping hoop to said base.

* * * * *